United States Patent
Yu et al.

(10) Patent No.: US 11,694,016 B2
(45) Date of Patent: Jul. 4, 2023

(54) FAST TOPOLOGY BUS ROUTER FOR INTERCONNECT PLANNING

(71) Applicant: Synopsys, Inc., Mountain View, CA (US)

(72) Inventors: Zhengtao Yu, Mountain View, CA (US); Balkrishna Rashingkar, Mountain View, CA (US); David Peart, Mountain View, CA (US); Douglas Chang, Mountain View, CA (US); Yiding Han, Mountain View, CA (US)

(73) Assignee: Synopsys, Inc., Sunnyvale, CA (US)

(*) Notice: Subject to any disclaimer, the term of this patent is extended or adjusted under 35 U.S.C. 154(b) by 56 days.

(21) Appl. No.: 17/345,878

(22) Filed: Jun. 11, 2021

(65) Prior Publication Data

US 2021/0390241 A1   Dec. 16, 2021

Related U.S. Application Data

(60) Provisional application No. 63/038,622, filed on Jun. 12, 2020.

(51) Int. Cl.
*G06F 30/394* (2020.01)
*G06F 30/392* (2020.01)
*G06F 119/18* (2020.01)

(52) U.S. Cl.
CPC .......... *G06F 30/394* (2020.01); *G06F 30/392* (2020.01); *G06F 2119/18* (2020.01)

(58) Field of Classification Search
USPC ........................................................ 716/100
See application file for complete search history.

(56) References Cited

U.S. PATENT DOCUMENTS

| | | | |
|---|---|---|---|
| 2012/0144358 A1* | 6/2012 | Alpert | G06F 30/394 716/113 |
| 2013/0283225 A1* | 10/2013 | Alpert | G06F 30/392 716/122 |
| 2014/0189630 A1* | 7/2014 | Viswanath | G06F 30/392 716/129 |
| 2020/0117521 A1* | 4/2020 | Dobbs | G06F 13/4027 |
| 2021/0390241 A1* | 12/2021 | Yu | G06F 30/392 |

* cited by examiner

*Primary Examiner* — Mohammed Alam
(74) *Attorney, Agent, or Firm* — Patterson + Sheridan, LLP

(57) ABSTRACT

A method includes receiving a netlist for a chip including a bus and determining, by one or more processors and based on the netlist, a first routing topology for the bus and through a routing region of the chip by comparing a demand of the bus to a capacity of a plurality of cells of the routing region. The method also includes generating a layout for the chip based on the first routing topology.

17 Claims, 14 Drawing Sheets

FAST TOPOLOGY BUS ROUTER FOR INTERCONNECT PLANNING

CROSS-REFERENCE TO RELATED APPLICATIONS

This application claims priority to and the benefit of U.S. Provisional Patent Application Ser. No. 63/038,622, entitled "Fast Topology Bus Router for Interconnect Planning," filed Jun. 12, 2020, which is incorporated herein by reference in its entirety.

TECHNICAL FIELD

The present disclosure relates to layout design for an integrated circuit. More particularly, the present disclosure relates to layout of interconnect buses for chips having multiple modules.

BACKGROUND

As technology advances, the design size of chips has increased dramatically as more functional modules are incorporated in one chip. Many integrated circuit designs have multiple child design modules that communicate with each other. In a high-speed system-on-chip (SoC) design, top level interconnect buses, which connect different design modules, can be a dominant factor in determining final chip performance and power usage. In various instances, multiple iterations from register-transfer level (RTL) design to final physical floorplan are completed to meet timing requirements. One of the stages involved in such iterations is top level interconnect bus planning. Since those top-level interconnect buses can be critical to determine the chip performance and feasibility, a fast and accurate methodology to implement and verify the timing and/or feasibility of those interconnect buses during an iteration is advantageous. However, due to the complexity involved in such planning, in many current implementations, the interconnect buses are manually planned. As the number of interconnect buses increase dramatically, the manual planning process increases in time and/or effort. In many instances, the amount of time required to complete the top-level interconnect bus planning in prohibitive.

SUMMARY

According to an embodiment, a method includes receiving a netlist for a chip comprising a bus and determining, by one or more processors and based on the netlist, a first routing topology for the bus and through a routing region of the chip by comparing a demand of the bus to a capacity of a plurality of cells of the routing region. The method also includes generating a layout for the chip based on the first routing topology.

The method may further include constructing, based on the netlist, a target for the bus. The bus may include a plurality of pins of a source connected to a plurality of pins of the target. Constructing the target may include determining a center pin of the plurality of pins of the source and a center pin of the plurality of pins of the target.

Comparing the demand of the bus to the capacity of the plurality of cells of the routing region may include comparing a first demand of a first portion of the bus to a capacity of a first cell of the plurality of cells and comparing a second demand of a second portion of the bus to a capacity of a second cell of the plurality of cells. The first cell may be adjacent to the second cell in the routing region. The first demand may be greater than the second demand. In the first routing topology, the first portion of the bus may be routed through the first cell and the second portion of the bus is routed through the second cell.

The method may also include determining, for the bus, a plurality of routing topologies through the routing region, the plurality of routing topologies comprising the first routing topology and determining a cost for each of the plurality of routing topologies by comparing a demand of the bus to a capacity of a plurality of cells of the routing region for the respective routing topology. The respective cost for the first routing topology may be lower than the costs for the other routing topologies of the plurality of routing topologies. The method may also include increasing a cost for a second routing topology of the plurality of routing topologies in response to determining that a plurality of cells for the second routing topology includes a blockage. The method may further include comparing a cost of a second routing topology of the plurality of routing topologies with a cost of a third routing topology of the plurality of routing topologies.

The method may also include undoing the first routing topology in response to determining that the first routing topology does not meet at least one of a timing requirement or a topology requirement. The method may further include adjusting the netlist in response to determining that the first routing topology does not meeting at least one of the timing requirement or the topology requirement.

The method may also include duplicating the first routing topology for a plurality of bits of the bus.

According to another embodiment, an apparatus includes a memory and a hardware processor communicatively coupled to the memory. The hardware processor receives a netlist for a chip comprising a bus and determines, based on the netlist, a first routing topology for the bus and through a routing region of the chip by comparing a demand of the bus to a capacity of a plurality of cells of the routing region. The hardware processor also generates a layout for the chip based on the first routing topology.

The hardware processor may also construct, based on the netlist, a target for the bus. The bus may include a plurality of pins of a source connected to a plurality of pins of the target. Constructing the target may include determining a center pin of the plurality of pins of the source and a center pin of the plurality of pins of the target.

Comparing the demand of the bus to the capacity of the plurality of cells of the routing region may include comparing a first demand of a first portion of the bus to a capacity of a first cell of the plurality of cells and comparing a second demand of a second portion of the bus to a capacity of a second cell of the plurality of cells. The first cell may be adjacent to the second cell in the routing region. The first demand may be greater than the second demand. In the first routing topology, the first portion of the bus may be routed through the first cell and the second portion of the bus is routed through the second cell.

The hardware processor may also determine, for the bus, a plurality of routing topologies through the routing region, the plurality of routing topologies comprising the first routing topology and determine a cost for each of the plurality of routing topologies by comparing a demand of the bus to a capacity of a plurality of cells of the routing region for the respective routing topology. The respective cost for the first routing topology may be lower than the costs for the other routing topologies of the plurality of routing topologies. The hardware processor may also increase a cost for a second routing topology of the plurality of routing topologies in response to determining that a plurality of cells for the second routing topology includes a blockage.

The hardware processor may also duplicate the first routing topology for a plurality of bits of the bus.

According to another embodiment, a method includes receiving a netlist for a chip comprising a bus and determining, by one or more processors and based on the netlist, a first cost for a first routing topology for the bus and through a routing region of the chip by comparing a demand of the bus to a capacity of a first plurality of cells of the routing region. The method also includes determining, by the one or more processor and based on the netlist, a second cost for a second routing topology for the bus and through the routing region of the chip by comparing the demand of the bus to a capacity of a second plurality of cells of the routing region. The second plurality of cells is different from the first plurality of cells. The method also includes, in response to determining that the first cost is lower than the second cost, generating a layout for the chip based on the first routing topology.

BRIEF DESCRIPTION OF THE DRAWINGS

The disclosure will be understood more fully from the detailed description given below and from the accompanying figures of examples described herein. The figures are used to provide knowledge and understanding of examples described herein and do not limit the scope of the disclosure to these specific examples. Furthermore, the figures are not necessarily drawn to scale.

DETAILED DESCRIPTION

Aspects described herein relate to fast topology bus router for interconnect planning. In the chip design process, to meet topology requirements and timing goals, interconnect bus planning can be a time intensive and, in many instances, a manually intensive process. The interconnect bus planning process may include many iterations, increasing the amount of time required for the planning process. Further, as the number of interconnect buses increases, the interconnect bus planning process increases in time. In many instances, routing bus bits are not kept together when generating the routing topology for interconnect buses. However, since the bus bits have similar connectivity and have a same or similar timing requirement, ideally all the routing bits with same routing topology would be kept together. Additionally, or alternatively, in many instances, a routing process does not utilize the available resource and blockages to generate the routing solution or solutions. In the following, an improved chip design process having an improved routing methodology is described that keeps bus bit routing together while employing a routing runtime that has an increased speed as compared to current methods.

The following describes an improved global routing-based method that can provide a faster routing process and can keeps the bus bits routing together. The global routing-based method can consider the available routing resources and can account for routing blockages (congestion), which can permit the global routing-based method to deliver improved quality of results (QoR).

Figure 1:
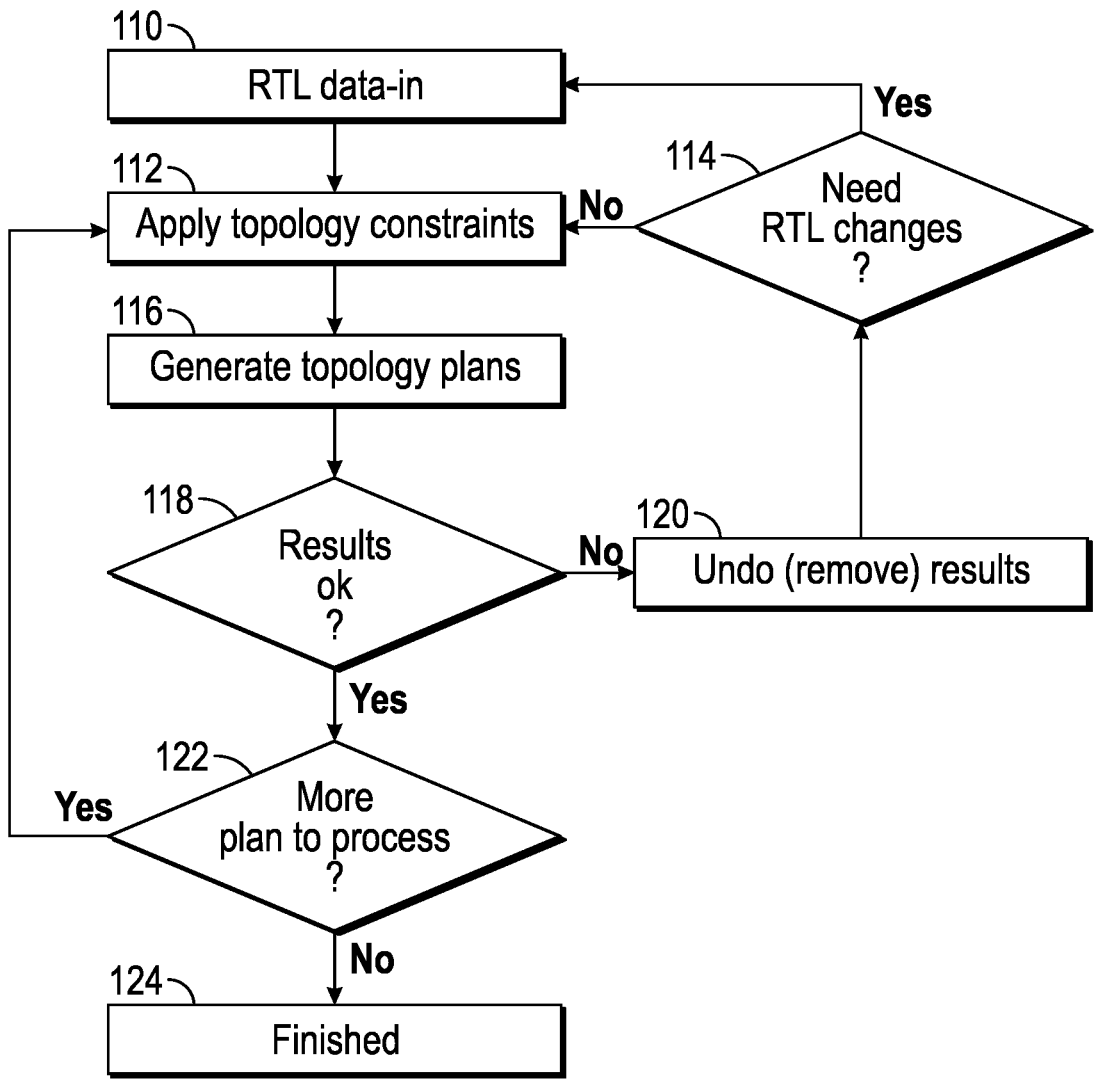
FIG. 1 illustrates a method of top level topology planning for interconnect buses in accordance with some examples of the present disclosure.

FIG. 1 illustrates a top-level interconnect bus planning flow for a chip design process. The flow may be executed by one or more processors (e.g., one or more of the processing device 1202 of FIG. 12). In one or more embodiments, the flow may be executed by one or more processors of one or more servers. In particular, the method of FIG. 1 includes receiving RTL data (at 110) with top level interconnect buses. The RTL data may be a netlist. At 112, topology constraints are applied to the RTL data, and at 116, topology plans are generated based on the constraints and RTL data. Generating the topology plans at 116 may include performing an optimization process. The optimization process may involve selecting some improvement (if an improvement is available), within the structure of the algorithm implemented, of some identified characteristic, and does not imply an absolute or global optimal (as the term is colloquially used) improvement of the characteristic. For example, in some situations where an optimization process may determine a minimum, the minimum may be a local minima rather than the global minimum.

A decision is made to determine if the generated topology plans meet timing and/or topology requirements (at 118). In response to the results not meeting timing and/or topology requirements, the current results are removed (or undone) at 120, and more iterations are performed to achieve the final timing and/or topology goal. At 114, if an RTL change is required, the process returns to the RTL input stage (at 110). If no RTL change is required, the process returns to add and/or modify topology plan constraints (at 112) such that the timing and/or topology goal can be achieved. Such iterations are repeated until the final timing/routing topology are satisfied. At 122, if there are more topology plans to process, additional topology constraints are applied (at 112). If there are no additional topology plans to process, the process is completed (at 124).

The following description focuses on the stage that generates interconnect bus routings to meet a timing and/or topology requirement as shown in 116 of the flowchart of FIG. 1. A topology bus router (e.g., global-routing-based topology bus router) is utilized to derive the routing topology. An interconnect bus (or bus) includes one or more bits. Further, each bit of a bus may correspond to a different wire (or trace) of the bus. In one example, a 32-bit bus has 32 wires. The topology bus router is based on global routing technology that divides the chip into small grids. Within each grid, the available tracks are calculated as capacity on each routing layer.

Figure 2A:
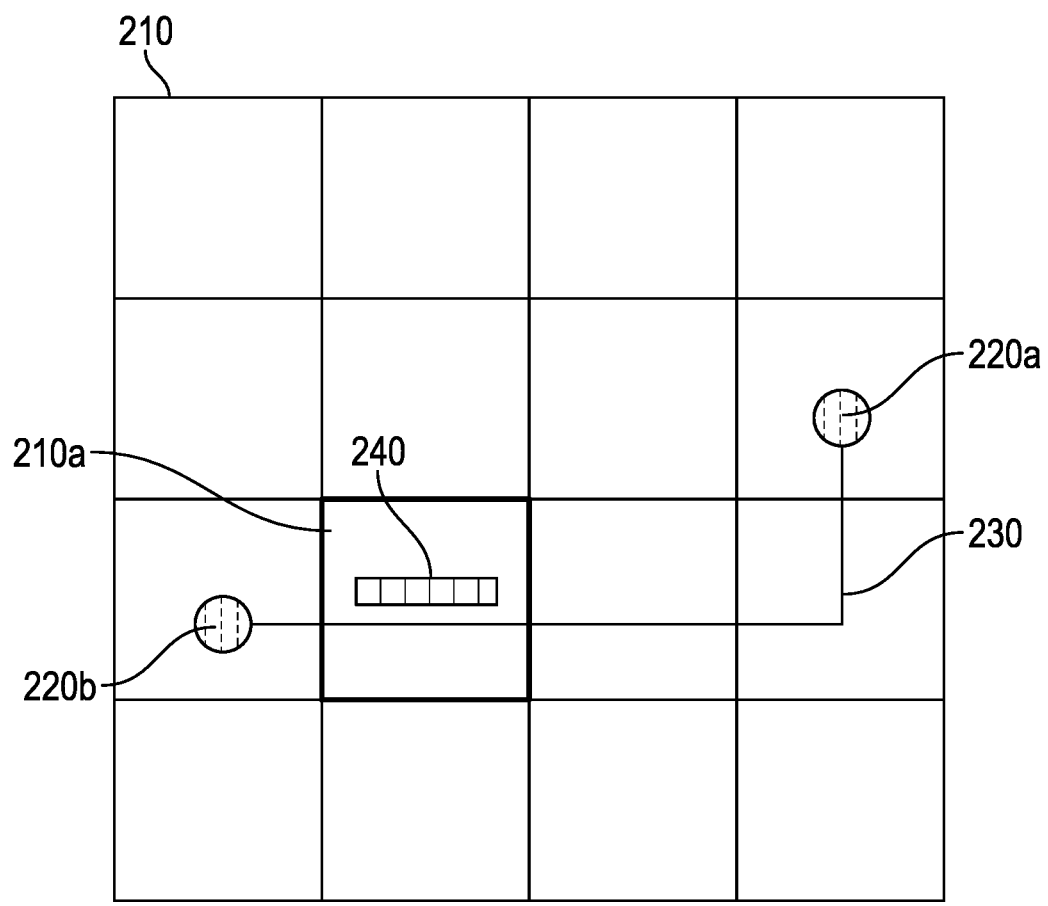
FIG. 2A illustrates maze wave expansion in global routing in accordance with some examples of the present disclosure.

During global routing, complex design rules are observed and a design is captured in a grid graph. For example, in a grid graph, complex design rules may be shown as routings and pins. During global routing, as illustrated in FIG. 2A, each layer of the entire routing region is partitioned into rectangular regions called global cells (gcell) 210. While performing global routing, the designs based on the objects (e.g., pins, blockages, and/or cell instances, etc.) within the design are extracted and the available resources (e.g., available wiretracks on each routing layer) are determined. The objects and resources are extracted and converted in each gcell grid (e.g., gcells 210). Each routing segment is extracted and used to determine demand within the corresponding gcells 210. The capacity and/or demand for each gcell grid and the global routing results may be determined at the end of the global routing process. As will be discussed in the following, the capacity and demand information for each gcell 210 is utilized to determine if a design is congested or not after global routing is completed.

The gcells include pins 220a, 220b, and routing 230. Element 240 corresponds to the used wire tracks within the gcell 210a.

Figure 2B:
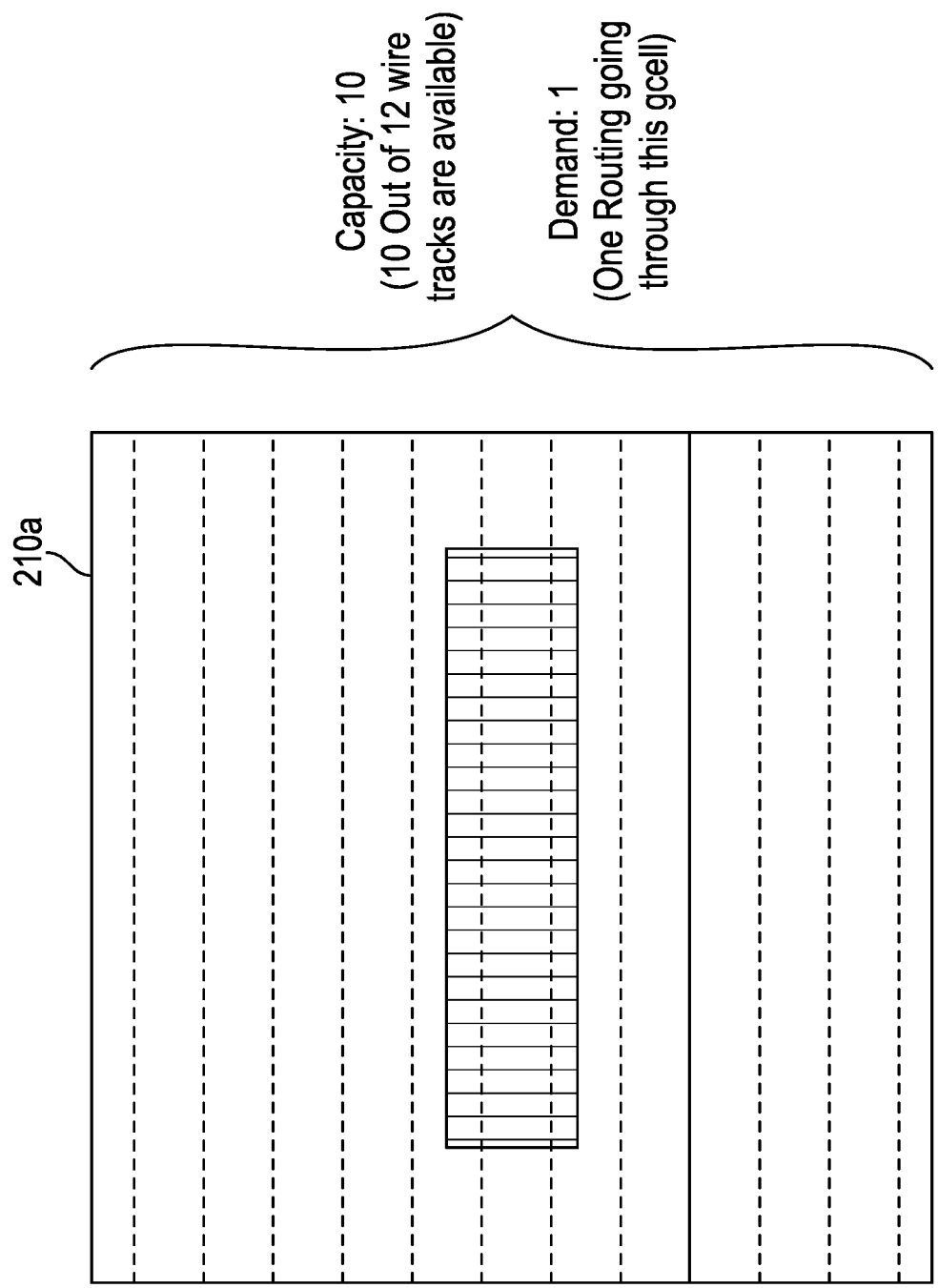
FIG. 2B illustrates capacity and demand calculation for a global cell in accordance with some examples of the present disclosure.
Figure 3:
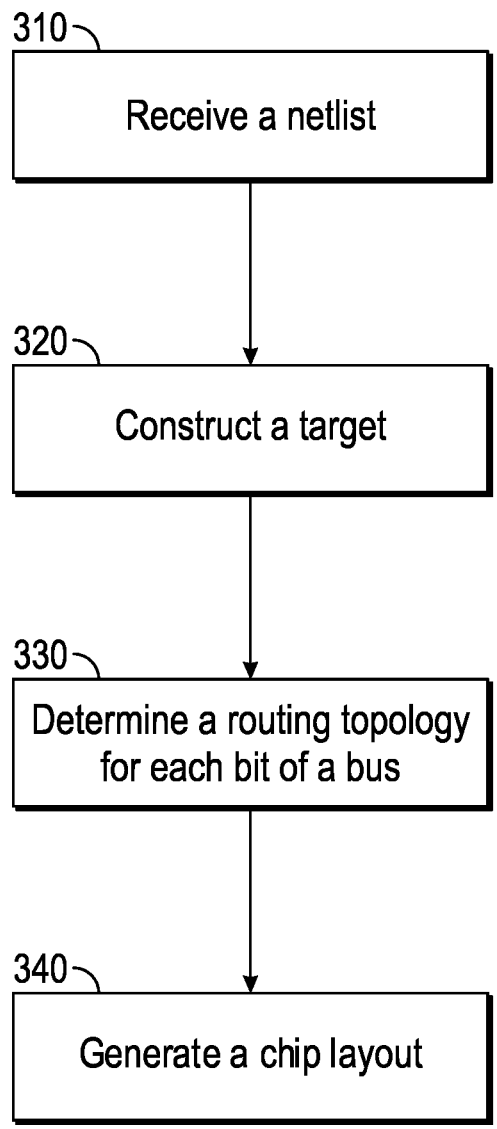
FIG. 3 illustrates a method of generating a chip layout in accordance with some examples of the present disclosure.

The capacity for a gcell, is the maximum free number of wires that can cross the gcell on a particular layer. The demand is the actual number of wires going through the gcell. The overflow is the number of differences between demand and capacity. A negative overflow number implies that the gcell has free wiretrack(s) available to allow more routing (demand) to go through this gcell. A positive number implies that the demand is more than capacity and should be avoided during global routing. FIG. 2B illustrates the capacity and demand calculation for the gcell 210a. The horizontal dashed lines in the gcell 210a represent the wire tracks. The rectangular region with the vertical bars in the gcell 210a represents a blockage. The solid horizontal line in the gcell 210a represents a routing. As seen in this example, two of the wire tracks are blocked and thus, the gcell 210a has a capacity of ten as ten out of twelve wiretracks are available. The unavailable wiretracks correspond to wiretracks that are already utilized for routing. For example, in the embodiment of FIG. 2B, two of the twelve wiretracks are used for routings. Further, the demand is one as one routing passes through the gcell 210a.

For routing buses to generate a topology, the bus bits (e.g., wires or traces) of a bus are routed separately based on the topology constraints. When routing each bus bit, different bus bits see the gcell capacity demand differently. As a result, all the bus bits cannot be guaranteed to be routed with the same topology. Accordingly, the bus nets routing split with different topologies and lead to undesired results. Further, runtime is slow as the bus bits (e.g., wires or traces) are routed separately. The overall runtime depends on the number of bus bits.

However, as is presented in the FIGS. 3-9 and described in the corresponding description, an improved topology bus routing method is described that can generate the same routing topology for all the bus bits with reduced runtime as compared to previous methods.

Figure 4:
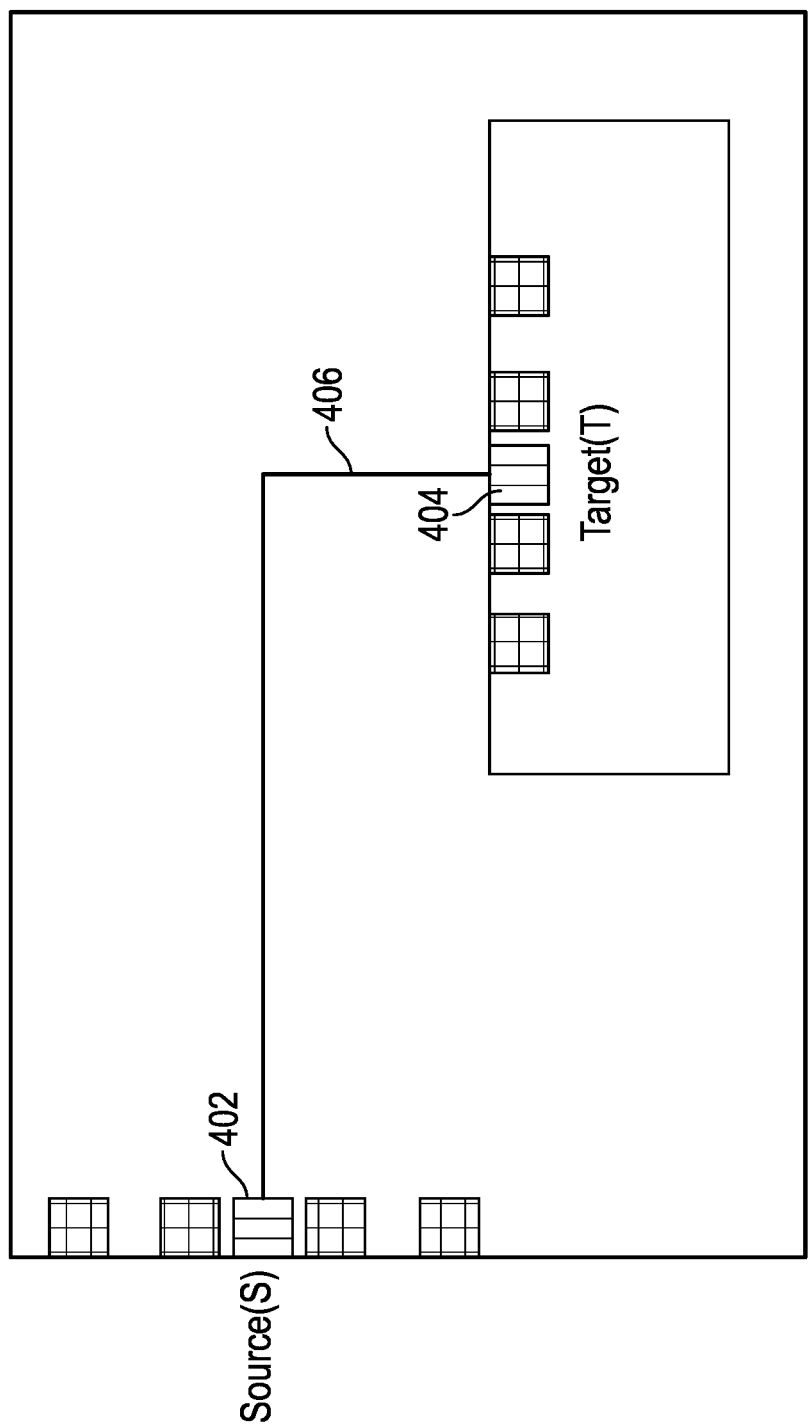
FIGS. 4, 5, and 6 illustrate routing target creation in accordance with some examples of the present disclosure.
Figure 7:
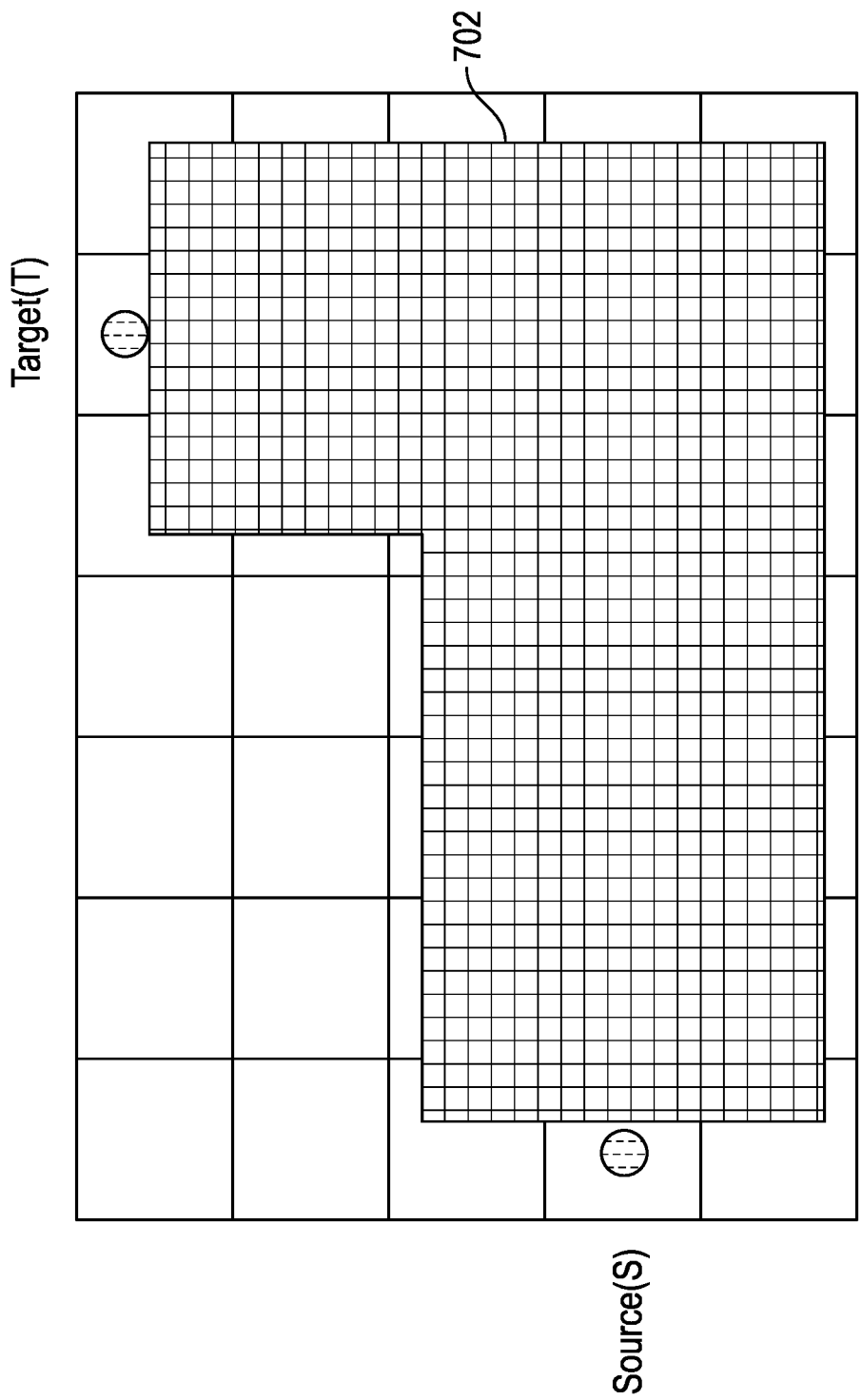
FIG. 7 illustrates bus routing results in accordance with some examples of the present disclosure.
Figure 8:
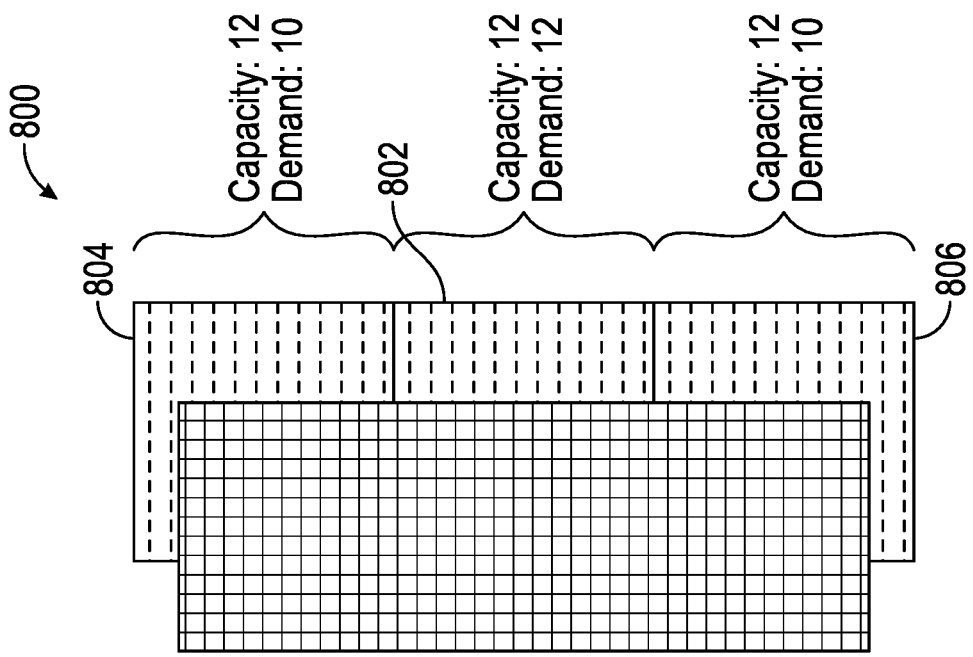
FIG. 8 illustrates capacity and demand calculation for a 32-bit bus in accordance with some examples of the present disclosure.

The topology bus routing method includes constructing routing targets based on the bus connection. Constructing the routing targets is executed by one or more processors (e.g., one or more of the processor 1202). At 310 of FIG. 3, netlist information is received. For example, the netlist information is provided at the output of the netlist verification step 1120 of FIG. 11. At 320 of FIG. 3, a routing target (e.g., a feature) that traverses all of the bus bit connections is generated. Routing targets based on all the bus bits connections are generated from the target. The target includes a plurality of pins, where each bit of a bus is connected to a different pin of the target. Each bus bit has a group of connected pins. For example, each bus bit is connected between a pin of a source and of a target. Different bus bits of a bus generally have similar connectivity. A center of the connected pins (e.g., a center of gravity) is determined and used to create routing targets for the topology bus router. FIG. 4 illustrates how to create routing targets. The pins 402, 404 illustrate how the routing targets appear. At 330 of FIG. 3, a routing topology for each bit of a bus is generated. A more detailed description of generating a routing topology for each bit of a bus is illustrated in FIGS. 7-9 and described in corresponding description. At 340 of FIG. 3, a chip layout is generated. For example, generating the chip layout may include any one or more of steps 1124-1140 of FIG. 11.

Figure 5:
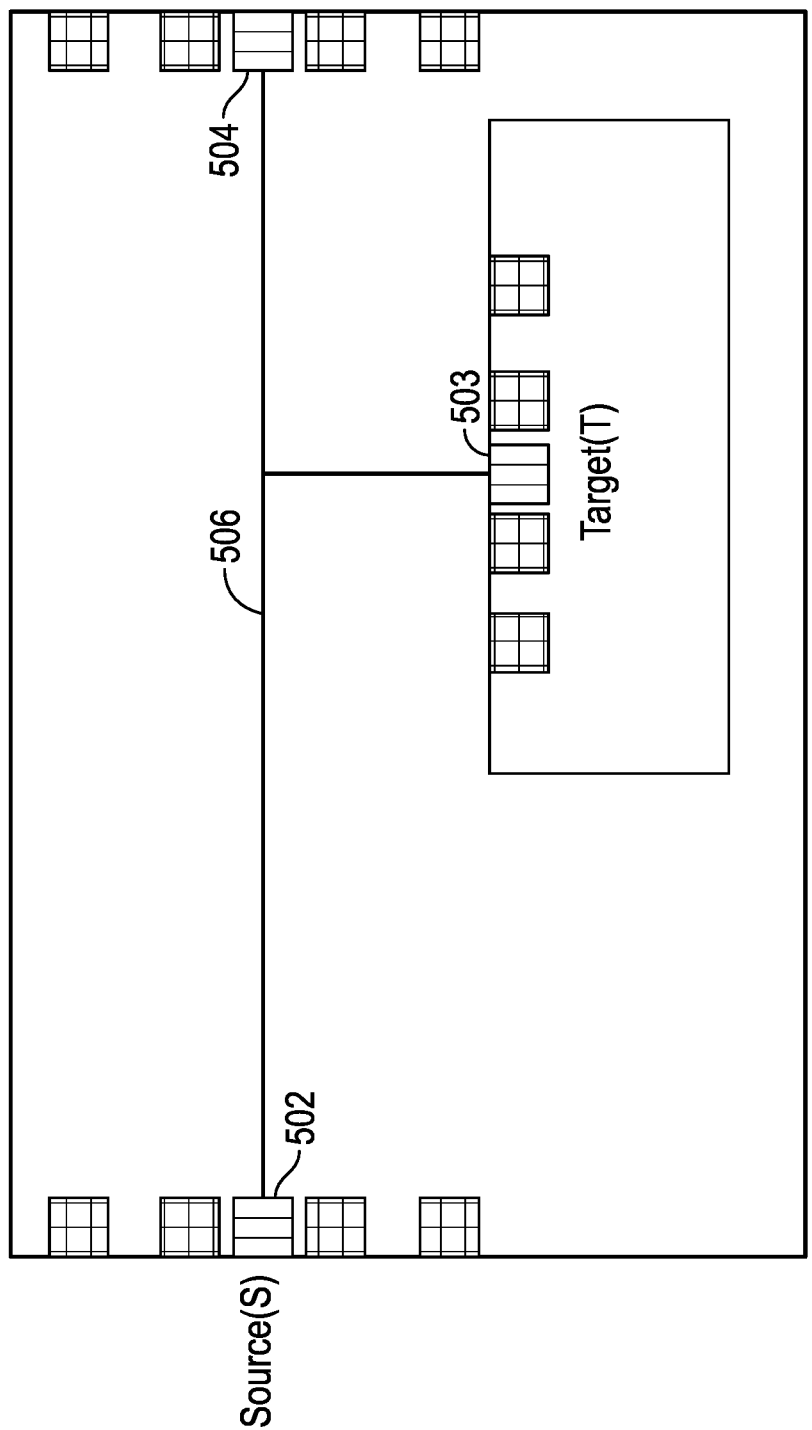

In the embodiment of FIG. 4, the bus bits have two pins for each net. For example, more than 90% of nets are 2-pin nets. In one or more embodiments, a respective net has more than 2-pins. In such instances, the bus is called a branching bus. Further, in such embodiments, the pins are grouped based on the connectivity and the pin locations. In the embodiment of FIG. 5, there are three routing targets 502, 503, and 504 for the bus. A first target pin 503 is created based on the connection of the child block. Two additional target pins 502 and 504 are created based on the top-level block connections. As there are two top level pins connected for each bus bit, two target pins 503 and 504 are created. Further, two target pins 503 and 504 are created, one for each side (edge) of the top level pin layout. After the target pins 502, 503, and 504 are created, routings for the three target pins 502, 503, and 504 are created. Line 406 in FIG. 4 and line 506 in FIG. 5 correspond to the results of global routing. The results are duplicated to each of the bus bits within a bus to create the actual routings.

Figure 6:
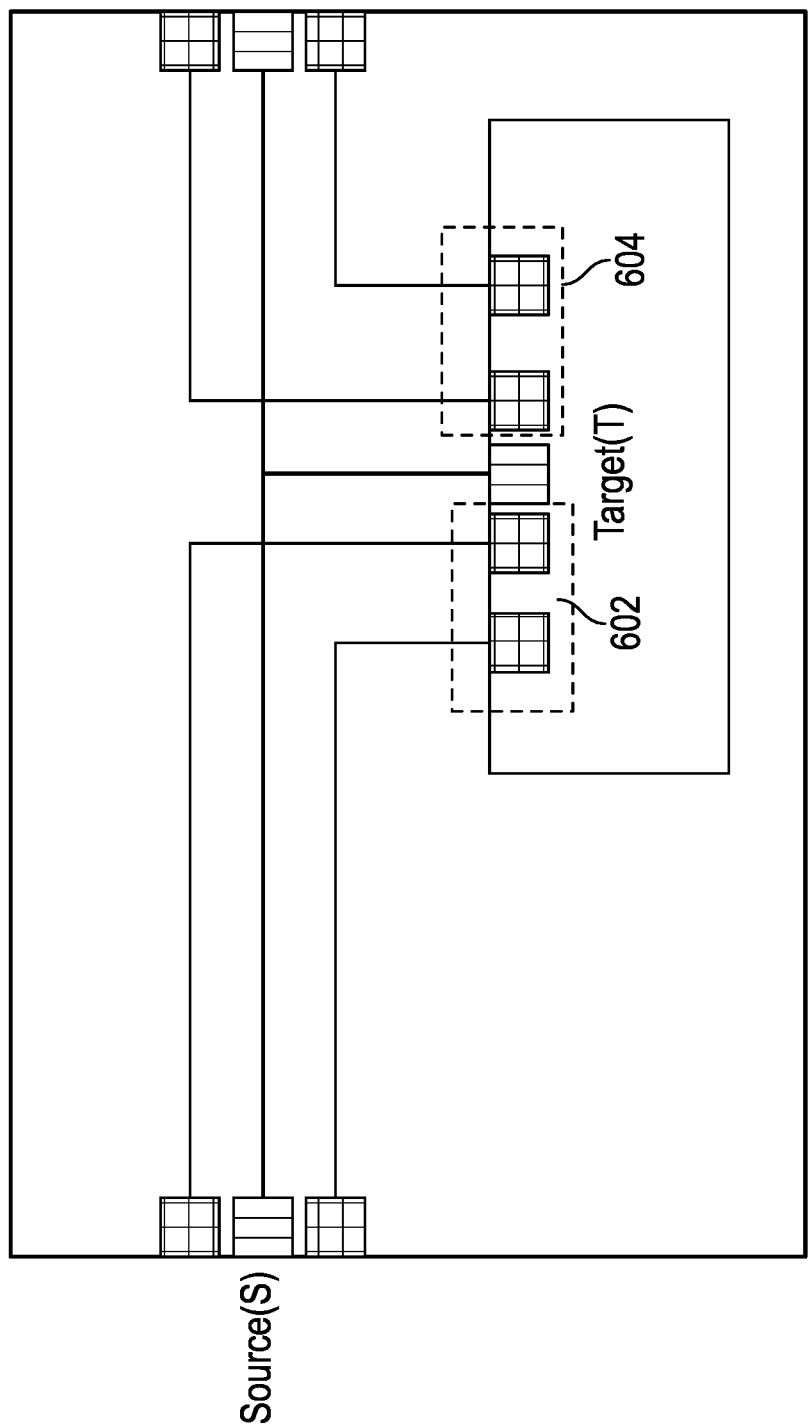

In one or more embodiments, one or more bus bits in a bus may have a different connection from other bus bits in the bus. For example, as shown in FIG. 6, 2-bits are connected to the target pins on the left (e.g., the target pins 602), and 2-bits are connected to the target pins on the right (e.g., the target pins 604). Each of the bus bits has two pins on the net, but the pin locations are not located together. Accordingly, three target pins are created.

The routing target or targets are connected to derive the routing topology for the whole bus once the routing target or targets are created. The routing topology method may be executed by one or more processors (e.g., one or more of the processor 1202) to derive the whole bus once the routing target or targets are created. Global routing technology may be utilized as the routing engine to perform the routing. In the embodiment of FIG. 7, when maze wave expansion in global routing is performed, the router expands the wave 702 from source to target based on the combined demand for all the bus bits. Maze wave expansion is utilized to determine a routing path within the gcells for a bus.

When estimating the demand for the bus bits, the demand calculation considers the array of the gcells together based on bus width. One or more processors (e.g., one or more of the processor 1202) estimates the demand for the bus bits. FIG. 8 shows how the demand is calculated when maze wave expands from the left of a gcell array to the right gcell array for horizontal routing. Maze wave expansion may be executed by one or more processors (e.g., one or more of the processor 1202). The vertical routing is similar as horizontal routing. In various instances, maze wave expansion includes horizontal and/or vertical routing within the gcell array. As illustrated in FIG. 8, when performing maze wave expansion horizontally, the process starts from the center gcell (e.g., gcell 802) and expands to upper/lower gcells (e.g., gcells 804 and 806) repeatedly until all of the available tracks in those gcells reaches the number of bus bits. In one embodiment, a first portion of the demand for a bus is compared to the capacity of a first gcell (e.g., gcell 802) and a second portion of the demand for a bus is compared to the capacity of a second gcell (e.g., the gcell 804 or 806). The first portion may be greater, less than, or equal to the second portion. As illustrated in FIG. 8, the capacity of the gcells 802, 804, and 806 exceeds the corresponding demand. Accordingly, maze wave expansion includes gcells 802, 804, and 806 when generating the routing path. For a 32-bit bus, the total demand is 32 which is divided across gcells (e.g., the gcells 802, 804, and 806). The demand of the middle gcell (e.g., the gcell 802) is greater than the demand of the adjacent gcells (e.g., the gcells 804 and 806). For example, the capacity of the gcell 802 (e.g., the middle gcell) is 12 while the demand is 12, and the capacity of the gcells 804 and 806 is 12 while the demand is 10.

In embodiments where the bus is a ripping bus, as illustrated in FIG. 5, the demand is derived based on the connected target pins as not all the bus bit connect to same target pin locations. Line 506 corresponds to the results of global routing. The results are duplicated to each of the bus bits within a bus to create the actual routings. As the bus in FIG. 5 is a ripping pus, the routing segments from the line 506 are selected based on the corresponding pins. For example, the bus bits of the bus connecting to the terminals on source select the left routing segments from the line 506.

Figure 9A:
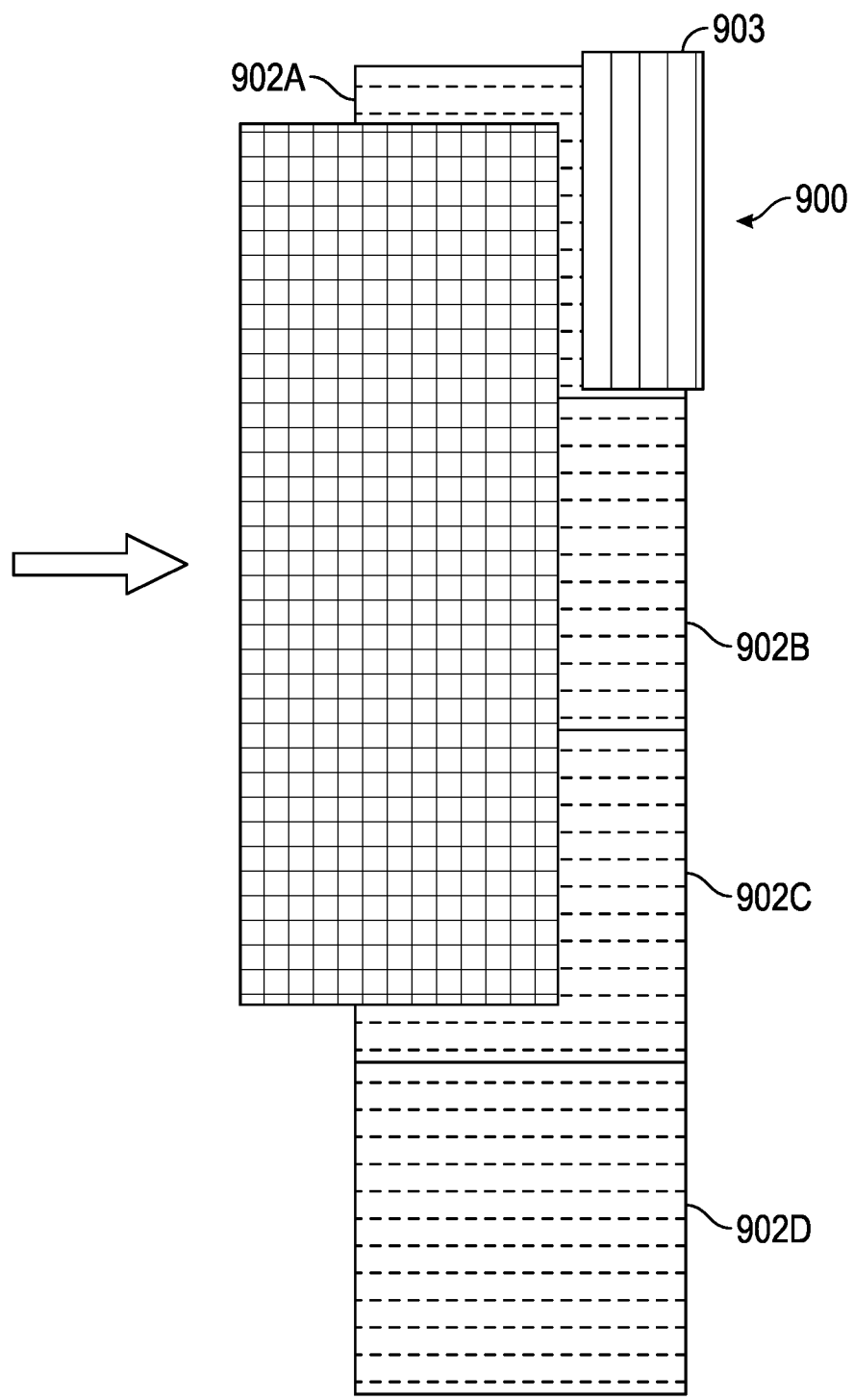
FIGS. 9A and 9B illustrate blockage detection in accordance with some examples of the present disclosure.

When performing wave expansion, to determine if a blockage of the expansion exists, the array of gcells (e.g., the array 800) is checked for a possible blockage together. When one or more of the gcells of the gcell arrays is blocked, routing through those gcell arrays is initially prevented. As illustrated in FIG. 9A, the route through adjacent gcells 902A, 902B, and 902C is being evaluated. The gcell 902A of the gcell array 900 is blocked by blockage 904. The blocked gcell or gcells refer to gcells that have a demand higher than a corresponding capacity. Arrays having a blocked gcell or gcells may be utilized when another valid routing path cannot be identified. In such embodiments, utilizing a routing path having a blocked gcell has an increased cost as compared to a routing path that does not include blocked gcells. For example, a second iteration may attempt to route the bus through gcells 902B, 902C, and a gcell 902D immediately below gcell 902C. This path may introduce a turn into the bus. If the gcell 902D is not blocked, then the second path will have a lower cost than the first path through gcells 902A, 902B, and 902C. As a result, the second path will be selected for the routing topology over the first path.

Figure 9B:
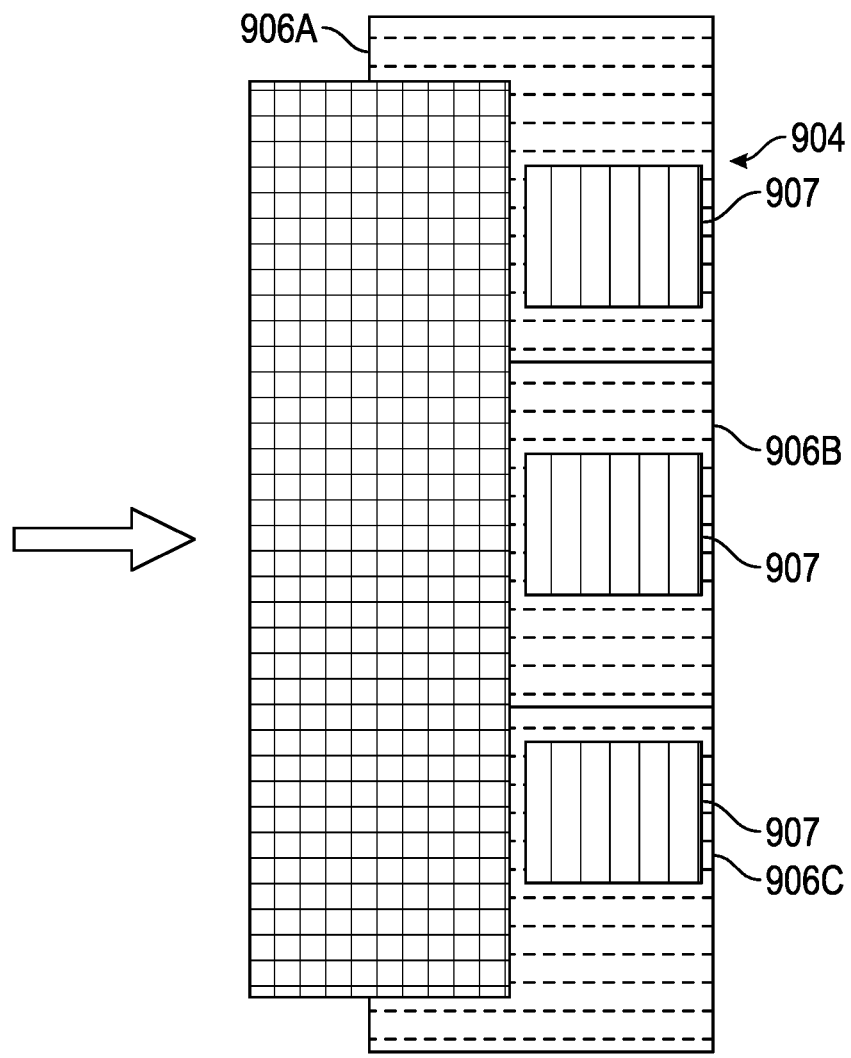

In the example of FIG. 9B, a path through the gcell array 904 is being considered. Specifically, the path routes the bus through adjacent gcells 906A, 906B, and 906C of the gcell array 904. Each of the gcells 906A, 906B, and 906C includes a partial blockage 907. Even if the gcells 906A, 906B, and 906C have enough capacity to meet the demand of the bus, the wires or bits of the bus would still be separated when being routed through the gcells 906A, 906B, and 906C. As a result, such a route would be assigned a cost that is higher than another route in which the wires or bits of the bus are not split or separated during routing. Additionally, the cost for this route would be lower than the route in the example of FIG. 9A in which the entire gcell 902A was blocked.

Figure 10:
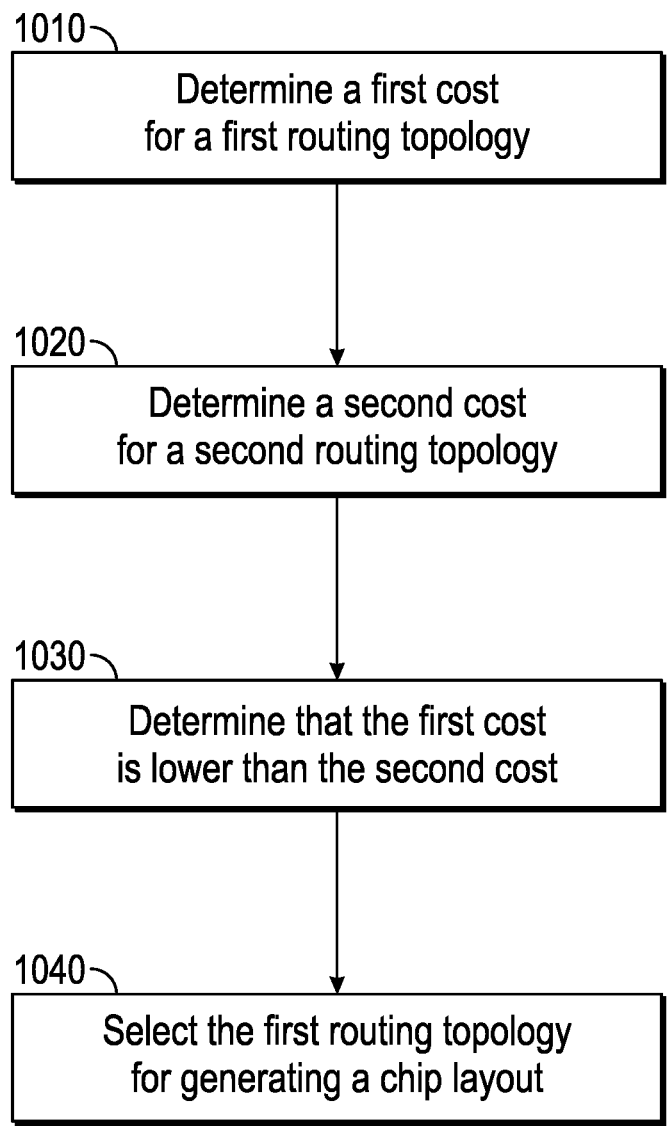
FIG. 10 illustrates a method of generating a chip layout in accordance with some examples of the present disclosure.

In some embodiments, several paths are determined through a gcell array and the costs for each path are determined. The cost for a path reflects how well the capacity of the gcells in that path meet the demand of the bus. An ideal path would be a path in which the bus is routed through gcells such that there are a minimal number of blockages and a minimal number of turns in the bus. The lowest possible cost would be for a path that has no blockages and that is completely straight. The path with the lowest cost is then selected as the routing topology for the bus. FIG. 10 is a flowchart of an example method of selecting a path as the routing topology for a bus. In certain embodiments, the steps of the method are performed as part of 330 in FIG. 3. In 1010, a first cost for a first routing topology is determined. The first cost may depend on several factors, such as (1) the number of blockages in the first routing topology that reduce the capacity of the gcells in the first routing topology, (2) the number of turns in the first routing topology, and/or (3) the number of times the wires or bits of a bus split or separate in the first routing topology. Using the example of FIG. 9A, a cost for the routing topology through the gcells 902B, 902C, and 902C may be determined. Although there may be no blockages in the second routing topology, there may still be a cost due to the second factor (e.g., the routing topology may have to turn downwards and then to the right to route through the gcells 902B, 902C, and 902D). In 1020, a second cost for a second routing topology is determined. The second cost may depend on the same factors for the second routing topology as the first cost does for the first routing topology. Using the example of FIG. 9A, a high cost for the routing topology through the gcells 902A, 902B, and 902C may be determined because of the first factor (e.g., the blockage 903 reduces the capacity of the gcell 902A or the gcells 902A, 902B, and 902C below the demand for the gcell 902A or the gcells 902A, 902B, and 902C).

In 1030, it is determined that the first cost is lower than the second cost. In response, in 1040, the first routing topology is selected for the bus. The first routing topology may then be used to generate a chip layout.

In some embodiments, a routing topology is determined iteratively. Using the example of FIG. 9A, at a first step, a left to right routing is attempted through gcells 902A, 902B, and 902C. When the blockage in gcell 902A is determined, a high cost is assigned to this first step. At a second step, a left to right routing is attempted through gcells 902B, 902C, and a gcell immediately below gcell 902C. A cost for that step is determined. This process continues until several possibilities for the left to right routing are considered. The step with the lowest cost is selected. The next step in the routing path is then determined using the previously selected step as a starting point. For example, if the step that routed the bus through gcells 902B, 902C, and the gcell immediately below gcell 902C is selected, then the next step may be another left to right routing through the gcells that are immediately to the right of the gcells 902B, 902C, and the gcell immediately below gcell 902C. Several different pathing options may be evaluated and the path with the lowest cost is selected as the next step. After the bus is routed to the target, the total cost of the path is determined. The process may then return to a previous step in the iterations to determine another path to the target and its associated cost. After several paths are determined, the path with the lowest cost is selected as the routing topology for the bus.

When the routing is completed, the routing topology can be duplicated to all the bus bits to generate the actual detail routing topology. For example, a routing topology is generated using the above described method for a first bit of a bus, and the routing topology may then be used to generate a routing topology of a second bit of the bus. In various embodiments, as the routing is performed once, the runtime is faster as compared to methods that route all the bus bits one by one. The runtime and QoR compared between the above described global-routing based bus router and conventional global routings methods on all the bus bits illustrates that the speed of above described global-routing based bus router is about 2 to about 200 times the speed of conventional methods, depending on the number of bits in a bus.

Figure 11:
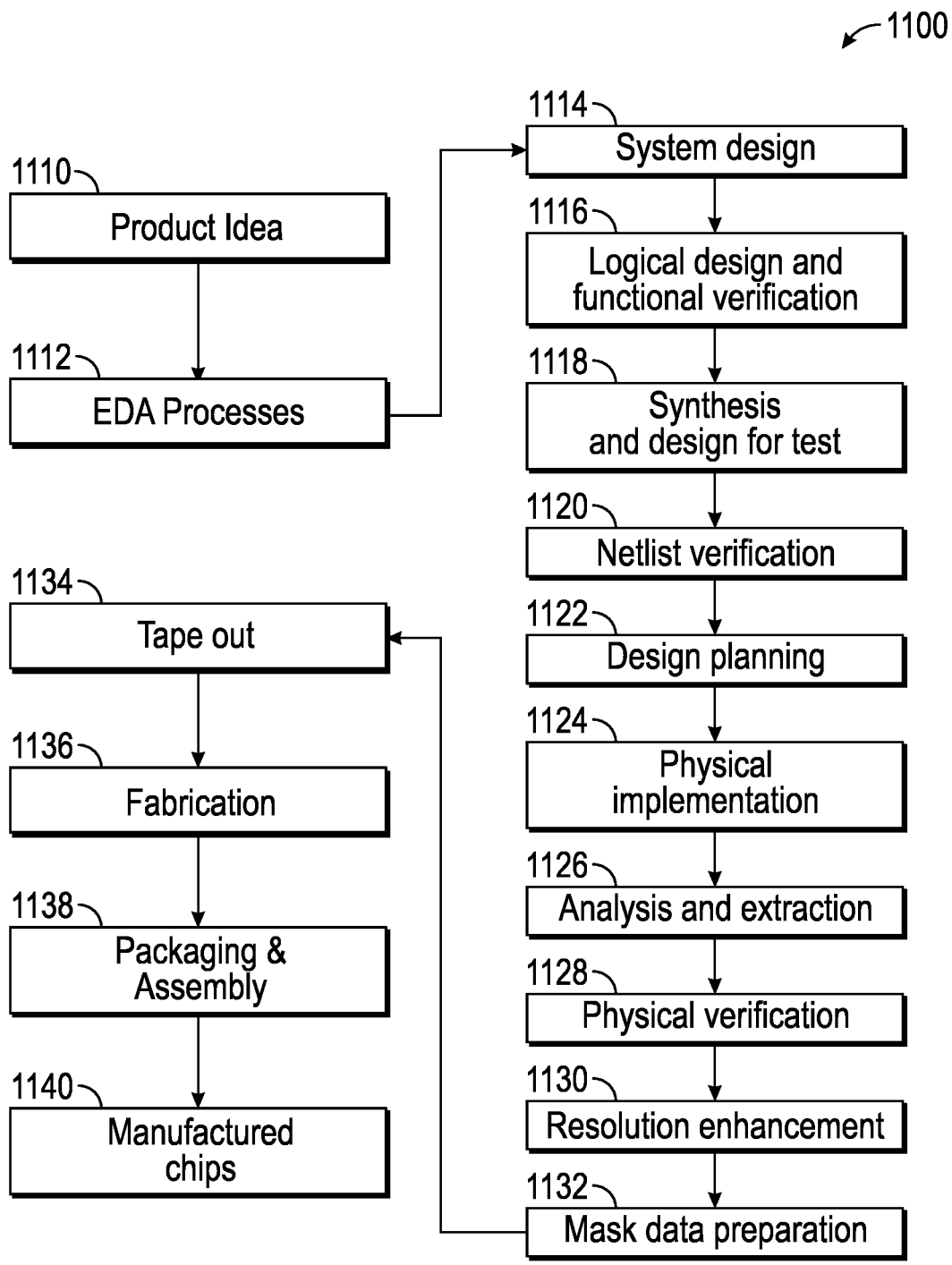
FIG. 11 depicts a flowchart of various processes used during the design and manufacture of an integrated circuit in accordance with some examples of the present disclosure.

FIG. 11 illustrates an example set of processes 1100 used during the design, verification, and fabrication of an integrated circuit on a semiconductor die to transform and verify design data and instructions that represent the integrated circuit. Each of these processes can be structured and enabled as multiple modules or operations. The term "EDA" signifies Electronic Design Automation. These processes start, at block 1110, with the creation of a product idea with information supplied by a designer, information that is transformed to create an integrated circuit that uses a set of EDA processes, at block 1112. When the design is finalized, the design is taped-out, at block 1134, which is when artwork (e.g., geometric patterns) for the integrated circuit is sent to a fabrication facility to manufacture the mask set, which is then used to manufacture the integrated circuit. After tape-out, at block 1136, the integrated circuit is fabricated on a semiconductor die, and at block 1138, packaging and assembly processes are performed to produce, at block 1140, the finished integrated circuit (oftentimes, also referred to as "chip" or "integrated circuit chip").

Specifications for a circuit or electronic structure may range from low-level transistor material layouts to high-level description languages. A high-level of representation may be used to design circuits and systems, using a hardware description language (HDL) such as VHDL, Verilog, SystemVerilog, SystemC, MyHDL or OpenVera. The HDL description can be transformed to a logic-level register transfer level (RTL) description, a gate-level description, a layout-level description, or a mask-level description. Each lower representation level that is a more detailed description adds more useful detail into the design description, such as, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 11. The processes described may be enabled by EDA products (or tools).

During system design, at block 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification, at block 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some examples, special systems of components, referred to as emulators or prototyping systems, are used to speed up the functional verification.

During synthesis and design for test, at block 1118, HDL code is transformed to a netlist. In some examples, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification, at block 1120, the netlist is checked for compliance with timing constraints and for correspondence with the HDL code. During design planning, at block 1122, an overall floor plan for the integrated circuit is constructed and analyzed for timing and top-level routing. In one or more embodiments, the method described above with regard to FIGS. 1-9, may be performed as part of design planning at block 1122.

During layout or physical implementation, at block 1124, physical placement (positioning of circuit components, such as transistors or capacitors) and routing (connection of the circuit components by multiple conductors) occurs, and the selection of cells from a library to enable specific logic functions can be performed. As used herein, the term "cell" may specify a set of transistors, other components, and interconnections that provides a Boolean logic function (e.g., AND, OR, NOT, XOR) or a storage function (such as a flip-flop or latch). As used herein, a circuit "block" may refer to two or more cells. Both a cell and a circuit block can be referred to as a module or component and are enabled as both physical structures and in simulations. Parameters are specified for selected cells (based on standard cells) such as size and made accessible in a database for use by EDA products.

During analysis and extraction, at block 1126, the circuit function is verified at the layout level, which permits refinement of the layout design. During physical verification, at block 1128, the layout design is checked to ensure that manufacturing constraints are correct, such as design rule check (DRC) constraints, electrical constraints, lithographic constraints, and that circuitry function matches the HDL design specification. During resolution enhancement, at block 1130, the geometry of the layout is transformed to improve how the circuit design is manufactured.

During tape-out, data is created to be used (after lithographic enhancements are applied if appropriate) for production of lithography masks. During mask data preparation, at block 1132, the tape-out data is used to produce lithography masks that are used to produce finished integrated circuits.

A storage subsystem of a computer system (such as computer system 1200 of FIG. 12) may be used to store the programs and data structures that are used by some or all of the EDA products described herein, and products used for development of cells for the library and for physical and logical design that use the library.

Figure 12:
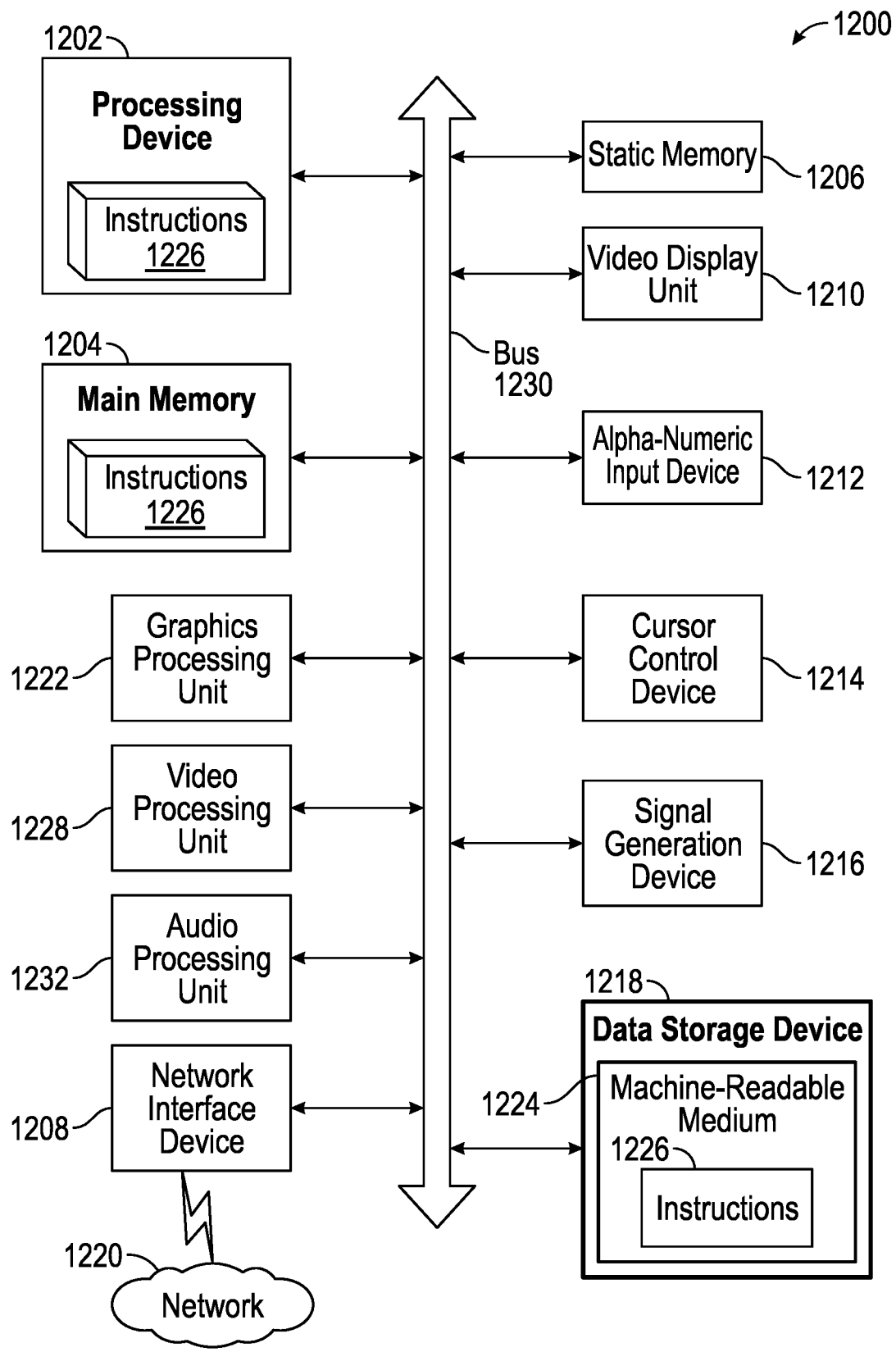
FIG. 12 depicts a diagram of an example computer system in which examples of the present disclosure may operate.

FIG. 12 illustrates an example of a computer system 1200 within which a set of instructions, for causing the computer system to perform any one or more of the methodologies discussed herein, may be executed. In some implementations, the computer system may be connected (e.g., networked) to other machines or computer systems in a local area network (LAN), an intranet, an extranet, and/or the Internet. The computer system may operate in the capacity of a server or a client computer system in client-server network environment, as a peer computer system in a peer-to-peer (or distributed) network environment, or as a server or a client computer system in a cloud computing infrastructure or environment.

The computer system may be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that computer system. Further, while a single computer system is illustrated, the term computer system shall also be taken to include any collection of computer systems that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230. The main memory 1204 includes or is a non-transitory computer readable medium. The main memory 1204 (e.g., a non-transitory computer readable medium) can store one or more sets of instructions 1226, that when executed by the processing device 1202, cause the processing device 1202 to perform some or all of the operations, steps, methods, and processes described herein.

Processing device 1202 represents one or more processors such as a microprocessor, a central processing unit, or the like. More particularly, the processing device 1202 may be or include complex instruction set computing (CISC) microprocessor, reduced instruction set computing (RISC) microprocessor, very long instruction word (VLIW) microprocessor, a processor implementing other instruction sets, or processor(s) implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing some or all of the operations, steps, methods, and processes described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (e.g., a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also including machine-readable storage media.

In some implementations, the instructions 1226 include instructions to implement functionality described above. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the computer system and that cause the computer system and the processing device 1202 to perform any one or more of the methodologies described above. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory (ROM), random access memory (RAM), magnetic disk storage media, optical storage media, flash memory devices, etc.

In the foregoing disclosure, implementations of the disclosure have been described with reference to specific example implementations thereof. It will be evident that various modifications may be made thereto without departing from the broader scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
receiving a netlist for a chip comprising a bus;
determining, by one or more processors and based on the netlist, a first routing topology for the bus and through a routing region of the chip by a process comprising comparing a first demand of a first portion of the bus to a capacity of a first cell of the routing region and comparing a second demand of a second portion of the bus to a capacity of a second cell of the routing region, wherein the first cell is adjacent to the second cell in the routing region; and
generating a layout for the chip based on the first routing topology.

2. The method of claim 1, further comprising constructing, based on the netlist, a target for the bus, wherein the bus comprises a plurality of pins of a source connected to a plurality of pins of the target, and wherein constructing the target comprises determining a center pin of the plurality of pins of the source and a center pin of the plurality of pins of the target.

3. The method of claim 1, wherein the first demand is greater than the second demand.

4. The method of claim 1, wherein, in the first routing topology, the first portion of the bus is routed through the first cell and the second portion of the bus is routed through the second cell.

5. The method of claim 1, further comprising:
determining, for the bus, a plurality of routing topologies through the routing region, the plurality of routing topologies comprising the first routing topology; and
determining a cost for each of the plurality of routing topologies by comparing a demand of the bus to a capacity of a plurality of cells of the routing region for the respective routing topology, wherein the respective cost for the first routing topology is lower than the costs for the other routing topologies of the plurality of routing topologies.

6. The method of claim 5, further comprising increasing a cost for a second routing topology of the plurality of routing topologies in response to determining that a plurality of cells for the second routing topology comprises a blockage.

7. The method of claim 5, further comprising comparing a cost of a second routing topology of the plurality of routing topologies with a cost of a third routing topology of the plurality of routing topologies.

8. The method of claim 1, further comprising undoing the first routing topology in response to determining that the first routing topology does not meet at least one of a timing requirement or a topology requirement.

9. The method of claim 8, further comprising adjusting the netlist in response to determining that the first routing topology does not meeting at least one of the timing requirement or the topology requirement.

10. The method of claim 1, further comprising duplicating the first routing topology for a plurality of bits of the bus.

11. An apparatus comprising:
a memory; and
a hardware processor communicatively coupled to the memory, the hardware processor configured to:
receive a netlist for a chip comprising a bus;
determine, based on the netlist, a first routing topology for the bus and through a routing region of the chip by a process comprising comparing a first demand of a first portion of the bus to a capacity of a first cell of the routing region and comparing a second demand of a second portion of the bus to a capacity of a second cell of the routing region, wherein the first cell is adjacent to the second cell in the routing region; and
generate a layout for the chip based on the first routing topology.

12. The apparatus of claim 11, the hardware processor further configured to construct, based on the netlist, a target for the bus, wherein the bus comprises a plurality of pins of a source connected to a plurality of pins of the target, and wherein constructing the target comprises determining a center pin of the plurality of pins of the source and a center pin of the plurality of pins of the target.

13. The apparatus of claim 11, wherein the first demand is greater than the second demand.

14. The apparatus of claim 11, wherein, in the first routing topology, the first portion of the bus is routed through the first cell and the second portion of the bus is routed through the second cell.

15. The apparatus of claim 11, the hardware processor further configured to:
determine, for the bus, a plurality of routing topologies through the routing region, the plurality of routing topologies comprising the first routing topology; and
determine a cost for each of the plurality of routing topologies by comparing a demand of the bus to a capacity of a plurality of cells of the routing region for the respective routing topology, wherein the respective cost for the first routing topology is lower than the costs for the other routing topologies of the plurality of routing topologies.

16. The apparatus of claim 15, the hardware processor further configured to increase a cost for a second routing topology of the plurality of routing topologies in response to determining that a plurality of cells for the second routing topology comprises a blockage.

17. The apparatus of claim 11, the hardware processor further configured to duplicate the first routing topology for a plurality of bits of the bus.

* * * * *